(12) United States Patent
Chang et al.

(10) Patent No.: US 7,724,019 B2
(45) Date of Patent: May 25, 2010

(54) ACTIVE DEVICE ARRAY SUBSTRATE

(75) Inventors: Heng-Hao Chang, Hsinchu (TW); Chuan-Feng Liu, Hsinchu (TW)

(73) Assignee: Prime View International Co., Ltd., Hsinchu (TW)

( * ) Notice: Subject to any disclaimer, the term of this patent is extended or adjusted under 35 U.S.C. 154(b) by 0 days.

(21) Appl. No.: 12/325,022

(22) Filed: Nov. 28, 2008

(65) Prior Publication Data

US 2010/0090715 A1    Apr. 15, 2010

(30) Foreign Application Priority Data

Oct. 13, 2008    (TW) .............................. 97139259 A

(51) Int. Cl.
*G01R 31/02* (2006.01)
*G01R 31/26* (2006.01)
(52) U.S. Cl. ............................. 324/770; 438/17; 257/48
(58) Field of Classification Search ................. 324/770; 438/14–19
See application file for complete search history.

(56) References Cited

U.S. PATENT DOCUMENTS

| | | | | |
|---|---|---|---|---|
| 5,900,644 A | * | 5/1999 | Ying et al. ................... | 257/48 |
| 7,358,756 B2 | * | 4/2008 | Kim et al. .................... | 324/770 |
| 7,498,209 B2 | * | 3/2009 | Oh et al. ...................... | 438/151 |
| 7,538,399 B2 | * | 5/2009 | Kim et al. .................... | 257/401 |
| 2006/0103410 A1 | * | 5/2006 | Jeon ............................ | 324/770 |

* cited by examiner

*Primary Examiner*—Ha Tran T Nguyen
*Assistant Examiner*—Emily Y Chan
(74) *Attorney, Agent, or Firm*—Chun-Ming Shih

(57) ABSTRACT

An active device array substrate has a display area and a peripheral circuit area and further includes a plurality of pixel units, a plurality of signal lines, a plurality of testing pads and a first dielectric layer. The pixel units are arranged in the display area in an array. The signal lines and the testing pads are arranged in the peripheral circuit area. The first dielectric layer covers the testing pads. A testing method of the active device array substrate is that firstly removing a part of the first dielectric layer to expose a testing pad(s) desired to electrically contact with a testing tool. In other words, before the testing, the testing pads are electrically insulated from the exterior to prevent the pixel units from the electrostatic charges damage and thus the circuit stability of the active device array substrate can be improved.

8 Claims, 9 Drawing Sheets

ACTIVE DEVICE ARRAY SUBSTRATE

BACKGROUND

1. Technical Field

The present invention generally relates to an active device array substrate and a testing method thereof and, particularly to, an active device array substrate which can prevent circuits thereof from being damaged by electrostatic charges through testing pads and a testing method of the active device array substrate.

2. Description of the Related Art

Since active flat display panels have the advantages of small size, light weight and fast response, the active flat display panels are widely applied on various electronic products. An active flat display panel generally is consisted of an active device array substrate, a display layer and a light-transmissive substrate. The display layer is sandwiched between the active device array substrate and the light-transmissive substrate and can be, for example a liquid crystal layer of a liquid crystal display (LCD) panel or an electrophoretic layer of an electrophoretic display (EPD) panel and so on.

FIG. 1 is a schematic view of a conventional active device array substrate. Referring to FIG. 1, the active device array substrate 100 has a display area 102 and a peripheral circuit area 104. The display area 102 has a plurality of pixel units 110 formed therein. The peripheral circuit area 104 has a plurality signal lines 120 formed therein for electrically connecting the pixel units 110 in the display area 102 to driver circuits 130.

A manufacturing process of a conventional active flat display panel is taken as an example, after completing the arrangement of all circuits on the active device array substrate 100, a circuit testing subsequently is performed to check whether the circuits on the active device array substrate 100 have defects or not. Therefore, testing pads 140 would be arranged in the peripheral circuit area 104 of the active device array substrate 100, and a testing tool (e.g., a probe, not shown in FIG. 1) can be connected with the circuits on the active device array substrate 100 through the testing pads 140.

However, regardless of a manufacturing apparatus, an operator or the active device array substrate 100, they would accumulate lots of electrostatic charges thereon. Therefore, when the active device array substrate 100 is in contact with the manufacturing apparatus, the operator or other objects in the manufacturing process, the electrostatic charges are prone to transfer to the active device array substrate 100 by the charged bodies and then are delivered to the circuits in the display area 102 through the signal lines 120 from the testing pads 140. As a result, the circuits in the display area 102 would suffer from electrostatic damage so that the active device array substrate 100 is destroyed.

FIG. 2 is a sectional view of the active device array substrate of FIG. 1, taken along lines I-I'. Referring to FIGS. 1 and 2, in order to avoid the electrostatic charges on the active device array substrate 100 to arrive in the display area 102 from the testing pads 140, a proposed design in the prior art is to firstly form a dielectric layer 125 on the signal lines 120 and then form the testing pads 140 on the dielectric layer 125 which is disposed above the signal lines 120. In other words, the testing pads 140 and the signal lines 120 have the dielectric layer 125 included therebetween, so as to avoid the electrostatic charges to be directly transferred to the circuits in the display area 102 through the signal lines 120 from the testing pads 140. Each of the testing pads 140 have a dielectric layer 150 and a conductive layer 160 formed thereon in sequence.

The dielectric layer 150 has an opening 152 and the conductive layer 160 is electrically connected with the testing pad 140 through the opening 152. When performing a testing, a laser beam can be used to weld the testing pad 140 and the signal line 120 and the testing tool is electrically connected to the conductive layer 160, the circuits on the active device array substrate 100 then can be tested.

However, before using the laser beam to weld the testing pad 140 and the signal line 120, since the testing pad 140, the dielectric layer 125 and the signal line 120 cooperatively constitute a capacitor C, although the electrostatic charges would not be directly transferred to the signal line 120 from the testing pad 140, when the testing pad 140 has excessive electrostatic charges accumulated thereon, a phenomenon of electrostatic breakdown would be occurred in an instant, which would cause serious damage applied to the active device array substrate 100.

BRIEF SUMMARY

Therefore, the present invention relates to an active device array substrate having a low electrostatic damage possibility and high circuit stability.

The present invention further relates to a testing method adapted to test an active device array substrate, so as to low the electrostatic damage possibility of the active device array substrate and improve the circuit stability thereof.

An active device array substrate in accordance with an embodiment of the present invention is provided. The active device array substrate has a display area and a peripheral circuit area, and further includes a plurality of pixel units, a plurality of signal lines, a plurality of testing pads and a first dielectric layer. The pixel units are arranged in the display area in an array. The signal lines and the testing pads are arranged in the peripheral circuit area. The first dielectric layer covers on the testing pads.

In one embodiment, each of the testing pads is electrically connected with one of the signal lines.

A testing method adapted to test the above-mentioned active device array substrate in accordance with one embodiment of the present invention is provided. The testing method is that: firstly removing a part of the first dielectric layer to expose at least one of the testing pads, and subsequently allowing a testing tool to electrically contact with the at least one exposed testing pad.

In one embodiment, a method of removing the part of the first dielectric layer includes laser removing.

In one embodiment, the testing pads are disposed on the signal lines and the active device array substrate further includes a second dielectric layer and a conductive layer, the second dielectric layer is disposed between the testing pads and the signal lines, and the conductive layer is disposed on the first dielectric layer above the testing pads.

Another testing method adapted to test the above-mentioned active device array substrate in accordance with an embodiment of the present invention is provided. The testing method is that: welding the conductive layer with at least one of the testing pads, welding the at least one testing pad welded to the conductive layer with the signal line below the at least one testing pad, and allowing a testing tool to electrically contact with the conductive layer.

In one embodiment, a method of welding the conductive layer with the at least one of the testing pads includes laser welding.

In one embodiment, a method of welding the at least one testing pad welded to the conductive layer with the signal line includes laser welding.

In one embodiment, the conductive layer is made of a material can be, for example a transparent conductive material such as indium tin oxide (ITO), indium zinc oxide (IZO), zinc oxide (ZnO) or indium gallium zinc oxide (IGZO).

In one embodiment, the active device array substrate further includes a plurality of driver chips arranged in the peripheral circuit area, the driver chips are electrically connected to the pixel units through the signal lines.

For the active device array substrate in accordance with the embodiments of the present invention, since the testing pads are electrically insulated with the exterior under the protection of the dielectric layer before performing a testing, electrostatic charges on the active device array substrate can be prevent from being transferred to the pixel units through signal lines from the testing pads, and thus the pixel units can be avoided to suffer from electrostatic damage.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
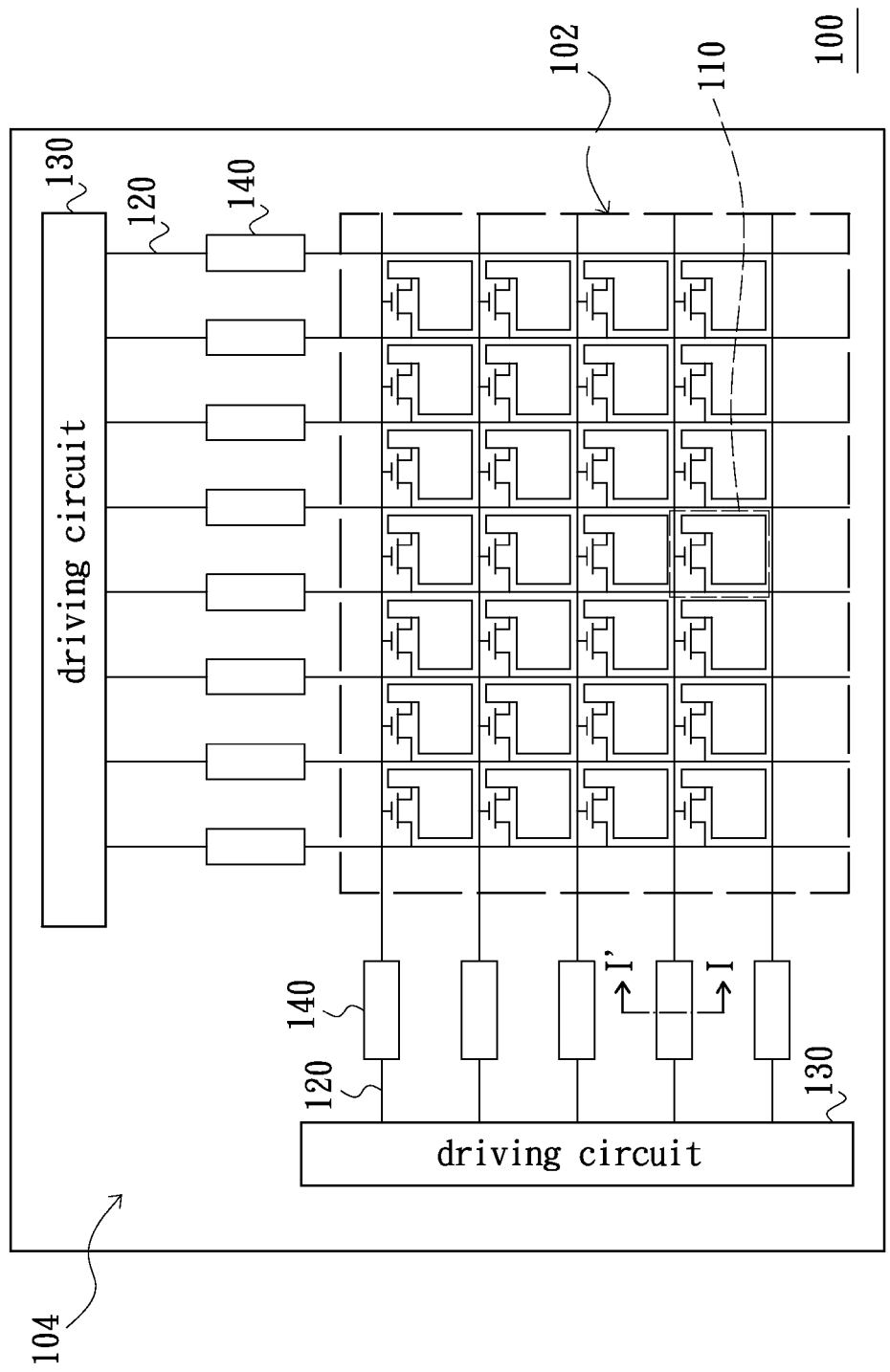
FIG. 1 is a schematic view of a conventional active device array substrate.
Figure 2:
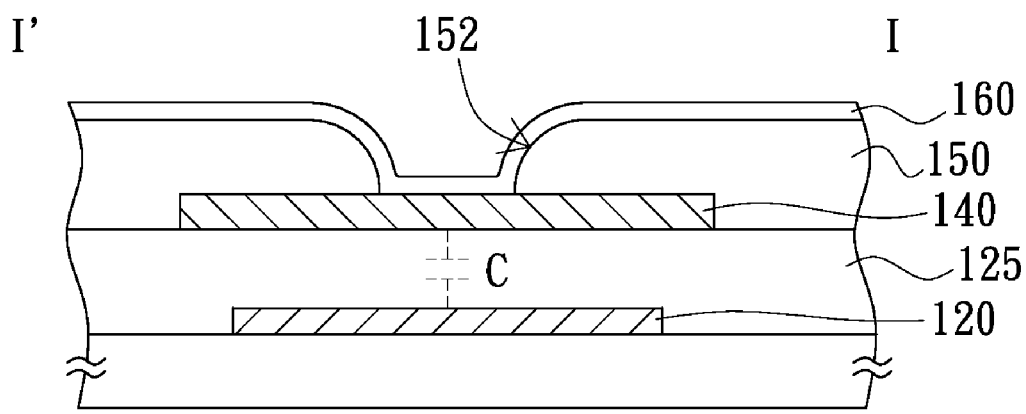
FIG. 2 is a sectional view of the active device array substrate of FIG. 1, taken along lines I-I'.
Figure 3:
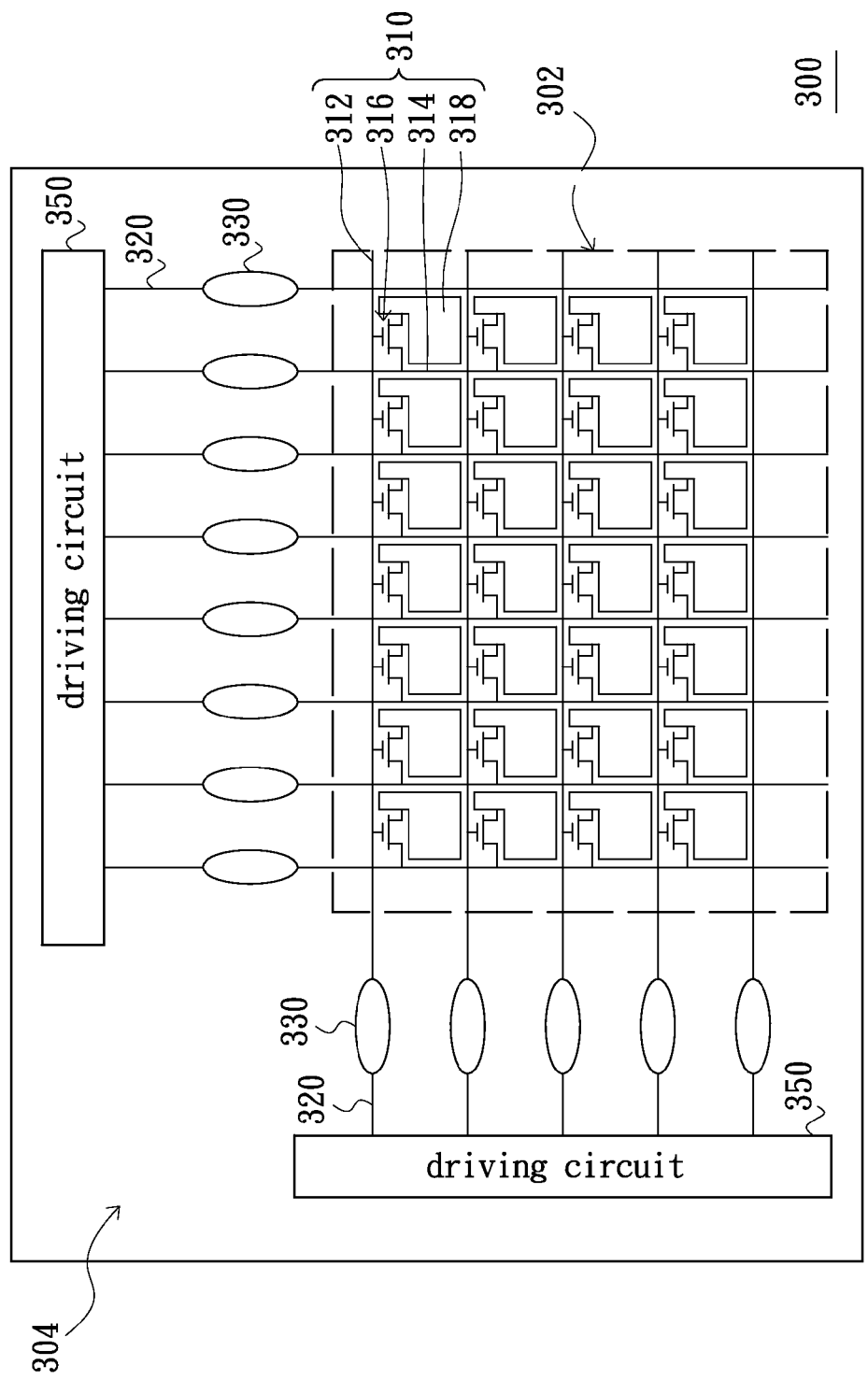
FIG. 3 is a schematic view of an active device array substrate in accordance with an embodiment of the present invention.
Figure 4:
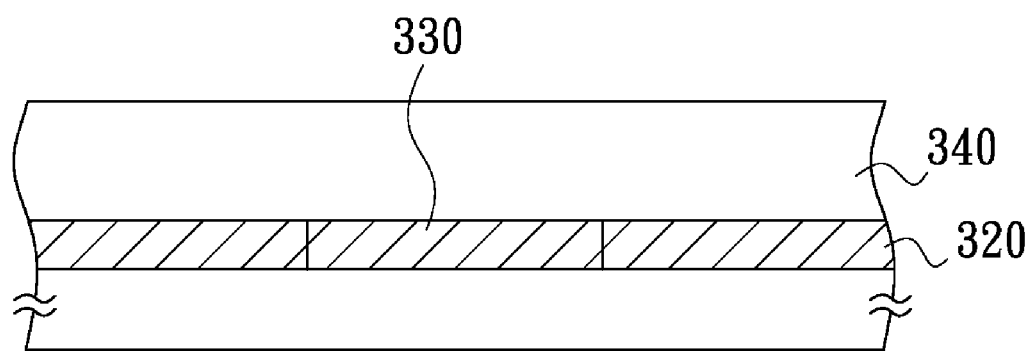
FIG. 4 is a sectional view of the active device array substrate at the location where a testing pad is disposed, in accordance with the embodiment of the present invention.

FIG. 3 is a schematic view of an active device array substrate in accordance with an embodiment of the present invention. FIG. 4 is a sectional view of the active device array substrate at the location where a testing pad is disposed. Referring to FIGS. 3 and 4, the active device array substrate 300 having a display area 302 and a peripheral circuit area 304 comprises a plurality of pixel units 310, a plurality of signal lines 320, a plurality of testing pads 330 and a first dielectric layer 340. The pixel units 310 are arranged in the display area 302 in an array.

More specifically, each of the pixel unit 310 for example is consisted of a scan line 312, a data line 314, an active device 316 and a pixel electrode 318. The scan line 312 and the data line 314 are substantially perpendicular to each other. The active device 312 and the pixel electrode 318 are disposed in a region surrounded by the scan line 312 and the data line 314. The active device 316 is electrically connected to the scan line 312, the data line 314 and the pixel electrode 318. In this embodiment, the active device 316 can be a thin film transistor (TFT) or other active switching element.

Still referring to FIG. 3, the signal lines 320 are arranged in the peripheral circuit area 304 of the active device array substrate 300. The pixel units 310 in the display area 302 are electrically connected to circuits in the peripheral circuit area 304 through the signal lines 320. In this embodiment, the pixel units 310 are electrically connected to driver circuits 350 by the signal lines 320. In other words, signals outputted from the driver circuits 350 are transmitted to the scan lines 312 or data lines 314 of the pixel units 310 through the signal lines 320, so as to drive the pixel units 310.

Figure 5A:
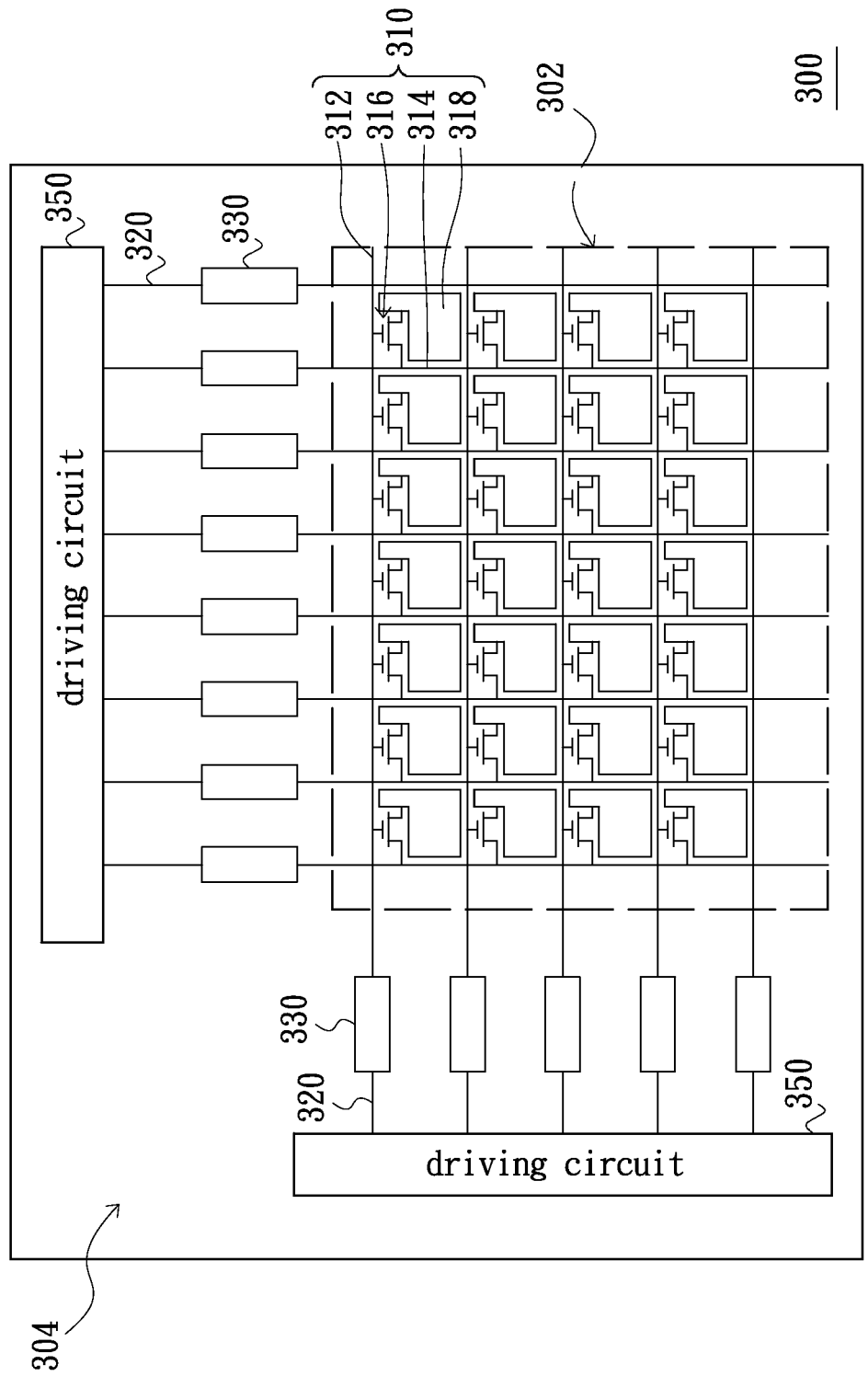
FIGS. 5A and 5B respectively are schematic views of active device array substrates in accordance with other embodiments of the present invention.
Figure 5B:
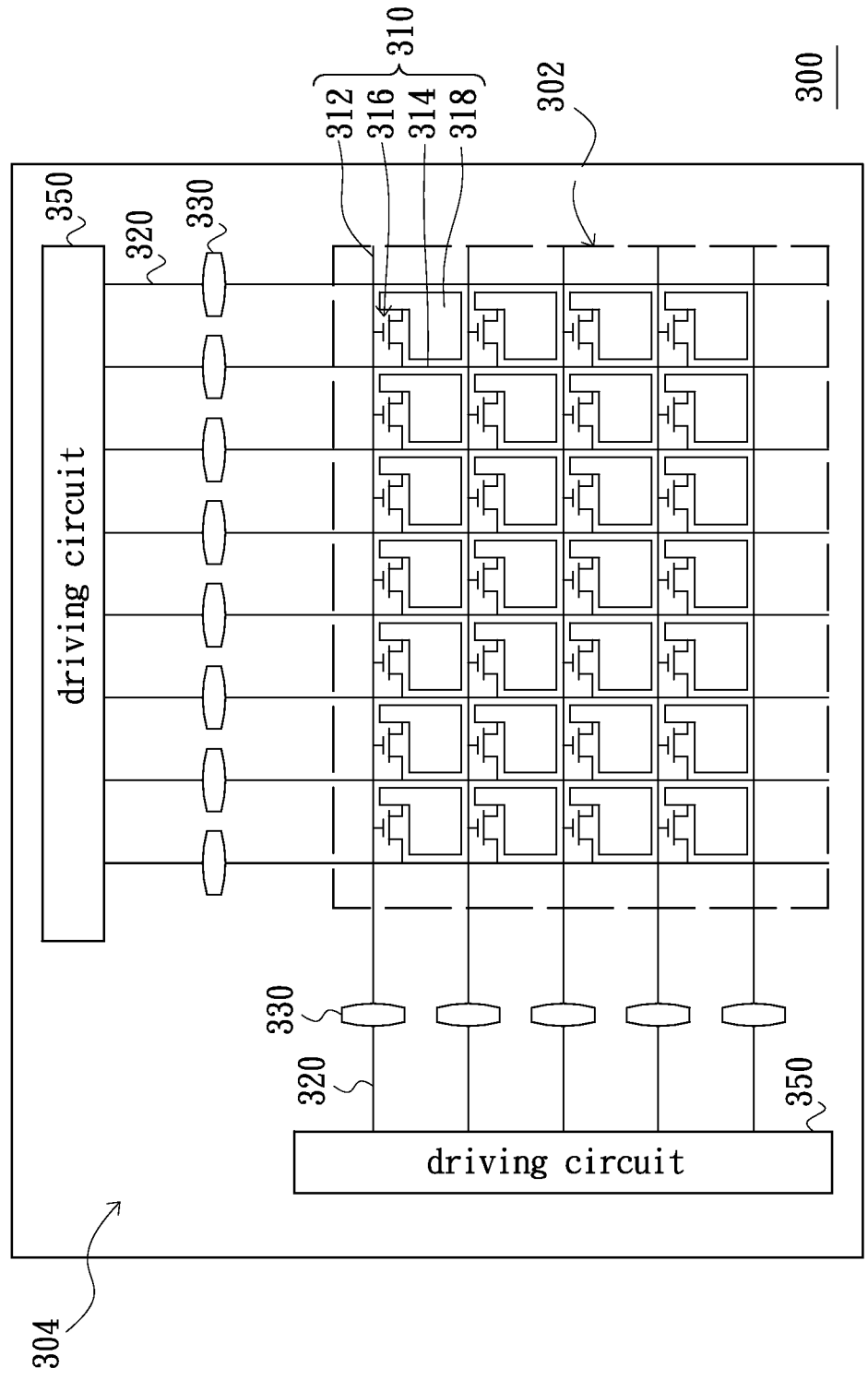

In another aspect, the testing pads 330 also are arranged in the peripheral circuit area 304. As illustrated in FIG. 4, the testing pads 330 and the signal lines 320 in this embodiment are disposed at the same layer and electrically connected to each other. It is indicated that, the shape of the testing pads 330 in accordance with the present invention has no strict limit, it can be an ellipse as illustrated in FIG. 3, a quadrilateral as illustrated in FIG. 5A or a quadrilateral having arc-shaped curves as illustrated in FIG. 5B.

Referring to FIGS. 3 and 4 again, the first dielectric layer 340 covers on the testing pads 330 and has no opening for exposing the testing pads 330. Therefore, electrostatic charges accumulated on the active device array substrate 300 do not transfer into the display area 302 through the testing pads 330. That is to say, the first dielectric layer 340 in this embodiment can act as an electrical protection layer of the testing pads 330, so as to avoid the pixel units 310 to suffer from electrostatic damage resulting from the electrostatic charges being transferred into the display area 302 through the testing pads 330 and the signal lines 320. In this embodiment, since the testing pads 330 and the signal lines 320 are located at the same layer, the first dielectric layer 340 also covers on the signal lines 320.

Figure 6A:
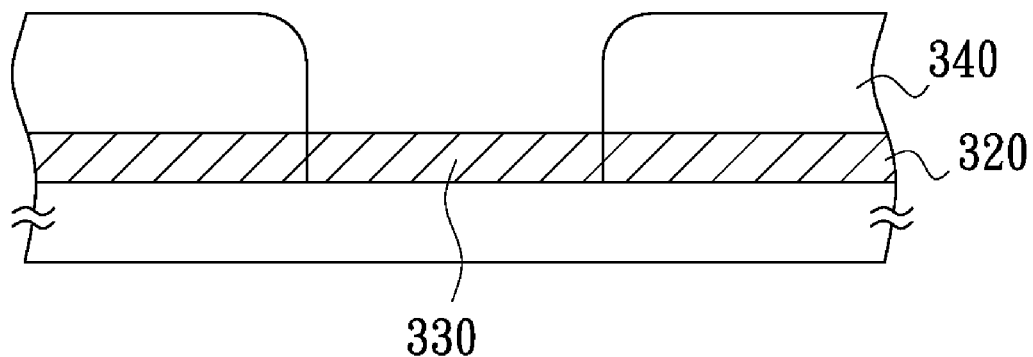
FIGS. 6A and 6B are partially sectional views of the active device array substrate of FIG. 3 during a testing.
Figure 6B:
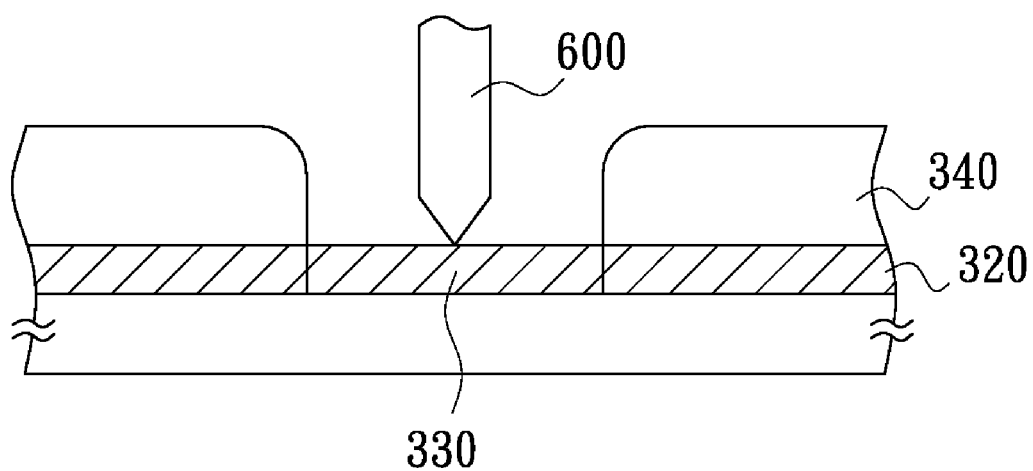

An exemplary testing method of the above-mentioned active device array substrate will be described below. FIGS. 6A and 6B are partially sectional views of the active device array substrate of FIG. 3 during the testing. Referring to FIG. 6A, when performing a testing applied to the circuits in the display area 302 through the testing pads 330, a part of the first dielectric layer 340 is firstly removed to expose the testing pad(s) 330 desired to electrically contact with a testing tool. In this embodiment, the part of the first dielectric layer 340 is removed for example by laser removing.

Referring to FIG. 6B, the testing tool 600 subsequently is electrically contacted with the testing pad(s) 330 exposed outside of the first dielectric layer 340. It is understood to the skilled person in the art, the testing tool 600 can be a probe connected to a testing apparatus (not shown) for inputting a testing signal to the pixel units 310 in the display area 302 though the testing pads 330 and the signal lines 320, so as to perform an electrical detection applied to the pixel units 310. Alternatively, the testing tool 600 can be a probe connected to an electrical measurement meter (e.g., multimeter) for testing the signal lines 320 whether have the existence of abnormal phenomenon of short-circuit or open-circuit through the testing pads 330.

Figure 7:
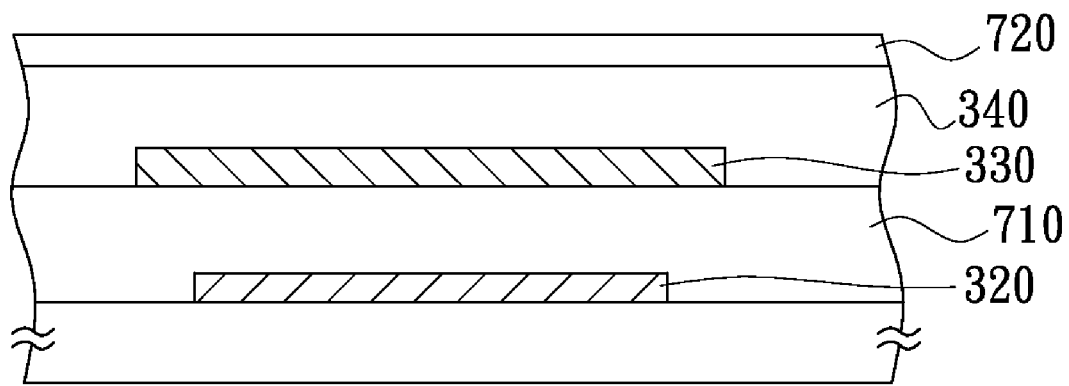
FIG. 7 is a sectional view of an active device array substrate at the location where a testing pad is disposed, in accordance with another embodiment of the present invention.

FIG. 7 is a sectional view of an active device array substrate at the location where a testing pad is disposed, in accordance with another embodiment of the present invention. Only differences of this embodiment from the foregoing embodiment will be described below in detailed, components in this embodiment having the same reference numbers as that in the foregoing embodiment refer to the description of the foregoing embodiment and will not be repeated herein.

Referring to FIG. 7, the active device array substrate in accordance with this embodiment further comprises a second dielectric layer 710 and a conductive layer 720, besides the pixel units 310, the signal lines 320, the testing pads 330 and the first dielectric layer 340 as illustrated in FIGS. 3 and 4. The testing pads 330 are disposed on the signal lines 320 and the second dielectric layer 710 is disposed between the testing pads 330 and the conductive layer 720. In other words, in this embodiment, the testing pads 330 and the signal lines 320 are not located at a same layer. The conductive layer 720 is disposed on the first dielectric layer 340 which is located above the testing pads 330.

Referring to FIGS. 3 and 7, before performing a testing, the testing pads 330 in this embodiment are not electrically connected with the signal lines 320, therefore even if electrostatic charges accumulated on the conductive layer 720 occur electrostatic breakdown and then arrive at the testing pads 330, they still could not enter into the circuits in the display area 302 through the signal lines 320 from the testing pads 330, so that the pixel units 310 in the display area 302 can be prevented from electrostatic damage.

Figure 8A:
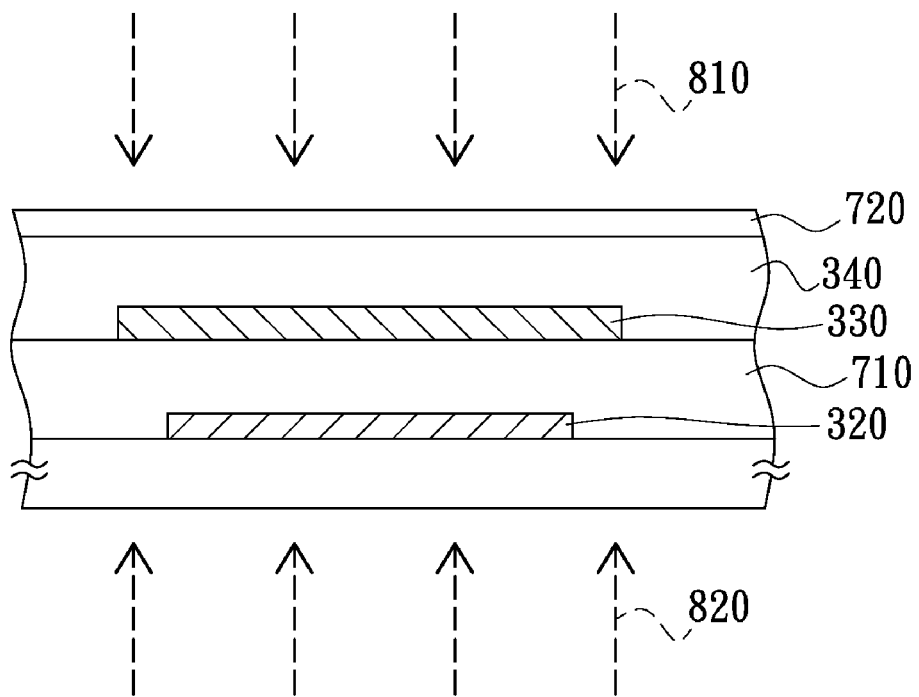
FIGS. 8A and 8B are partially sectional views of the active device array substrate during a testing, in accordance with the another embodiment of the present invention.
Figure 8B:
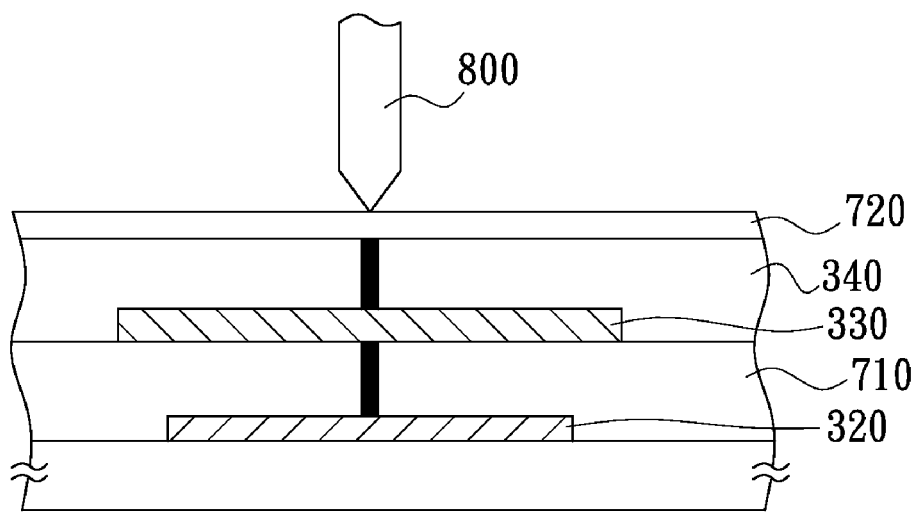

An exemplary testing method of the above-mentioned active device array substrate will be described below. FIGS. 8A and 8B are partially sectional views of the active device array substrate in accordance with another embodiment of the present invention during a testing.

Referring to FIG. 8A, when performing a testing applied to the circuits in the display area 302 through the testing pads 330, the conductive layer 720 and the testing pads 330 are needed to be welded together, and the testing pads 330 also are needed to be welded together with the signal lines 320. In this embodiment, the conductive layer 720 and the testing pads 330 as well as the testing pads 330 and the signal lines 320 are welded together by for example laser welding. In particular, the laser welding for the conductive layer 720 and the testing pads 330 for example is that allowing a laser beam 810 to incident from above the conductive layer 720. The laser welding for the testing pads 330 and the signal lines 320 is that allowing a laser beam 820 to incident from below the signal lines 320.

Referring to FIG. 8B, after completing the welds of the conductive layer 720 and the testing pads 330 as well as the testing pads 330 and the signal lines 320, a testing tool 800 subsequently is allowed to electrically contact with the conductive layer 720 so as to facilitate the testing applied to the circuits on the active device array substrate 700 by the testing tool 800. As described in the foregoing embodiment, the testing tool 800 can be a probe connected to a testing apparatus or a probe connected to an electrical measurement meter, the skilled person in the art can select an expected testing tool 800 according to the actual requirement of the testing.

As seen from the above-mentioned description, on the active device array substrate in accordance with the present invention, the dielectric layer to covers the testing pads as an electrical protection layer of the testing pads. During the testing of the active device array substrate in accordance with the present invention, if the testing pads and the signal lines are located at a same layer and there is not any layer formed on the dielectric layer above the testing pads, only need to remove a part of the dielectric layer above the testing pad(s) so as to expose the testing pad(s) desired to electrically contact with the testing tool. In another aspect, if the testing pads and the signal lines are not located at a same layer and there is a conductive layer formed on the dielectric layer above the testing pads, the conductive layer and the testing pads as well as the testing pads and the signal pads are needed to weld together, then a testing tool is electrically contacted with the conductive layer welded to the testing pads so as to perform a testing applied to the circuits on the active device array substrate.

In summary, for the active device array substrate in accordance with the present invention, before the testing thereof, the testing pads thereof are electrically insulated from the exterior under the protection of the dielectric layer, therefore electrostatic charges on the active device array substrate can be prevented from being transferred into the pixel units through the signal lines from the testing pads. As a result, the pixel units are avoided to suffer from electrostatic damage and thus the circuit stability of the active device array substrate is improved.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An active device array substrate having a display area and a peripheral circuit area, the active device array substrate comprising:
   a plurality of pixel units, arranged in the display area in an array;
   a plurality of signal lines, arranged in the peripheral circuit area and electrically connected with the pixel units;
   a plurality of testing pads, arranged in the peripheral circuit area and disposed above the signal lines;
   a first dielectric layer covering the testing pads;
   a second dielectric layer, disposed between the testing pads and the signal lines; and
   a conductive layer, disposed on the first dielectric layer located on the testing pads.

2. The active device array substrate as claimed in claim 1, wherein the conductive layer is comprised of a transparent conductive material.

3. The active device array substrate as claimed in claim 2, wherein the conductive layer is comprised of a material selected from a group consisting of indium tin oxide, indium zinc oxide, zinc oxide and indium gallium zinc oxide.

4. The active device array substrate as claimed in claim 1, further comprising a plurality of driver chips arranged in the peripheral circuit area, wherein the driver chips are electrically with the pixel units through the signal lines.

5. The active device array substrate as claimed in claim 1, wherein the conductive layer is welded to the testing pads, and the testing pads are welded to the respective signal lines during a circuit testing for the active device array substrate.

6. An active device array substrate having a display area and a peripheral circuit area, the active device array substrate comprising:
   a plurality of pixel units arranged in the display area;
   a plurality of signal lines arranged in the peripheral circuit area;
   a plurality of driver circuits arranged in the peripheral circuit area and electrically connected with the pixel units through the signal lines;
   a plurality of testing pads arranged in the peripheral circuit area and located between the display area and the driver circuits;

an electrical protection layer arranged on the testing pads and thereby electrostatic charges accumulated on the active device array substrate are prevented from being transferred into the pixel units through the signal lines from the testing pads before a circuit testing for the active device array a dielectric layer, disposed between the testing pads and the signal lines; and a conductive layer, disposed on the electrical protection layer located on the testing pads.

7. The active device array substrate as claimed in claim 6, wherein each of the testing pads is electrically connected with one of the signal lines.

8. The active device array substrate as claimed in claim 6, wherein the conductive layer is welded together with the testing pads, and the testing pads are welded together with the respective signal lines during a circuit testing for the active device array substrate.

* * * * *